(12) United States Patent
Chin et al.

(10) Patent No.: US 8,108,277 B2
(45) Date of Patent: Jan. 31, 2012

(54) SALES SYSTEM WITH BUYER PRICE SELECTION

(75) Inventors: Jeff Chin, Newton, MA (US); Valerie Johns, Lexington, MA (US); Rick Simpson, Cambridge, MA (US); David Traynor, Marblehead, MA (US)

(73) Assignee: eBay Inc., San Jose, CA (US)

( * ) Notice: Subject to any disclaimer, the term of this patent is extended or adjusted under 35 U.S.C. 154(b) by 197 days.

(21) Appl. No.: 11/352,173

(22) Filed: Feb. 10, 2006

(65) Prior Publication Data

US 2006/0129476 A1 Jun. 15, 2006

Related U.S. Application Data

(63) Continuation of application No. 09/685,449, filed on Oct. 11, 2000, now Pat. No. 7,860,776.

(51) Int. Cl.
  G06Q 40/00 (2006.01)
  G06Q 30/00 (2006.01)
(52) U.S. Cl. ....... 705/35; 705/26.1; 705/26.3; 705/27.1; 705/27.2
(58) Field of Classification Search ............... 705/1, 1.1, 705/26, 26.1, 26.3, 26.4, 27, 27.1, 28, 35, 705/37, 27.2
  See application file for complete search history.

(56) References Cited

U.S. PATENT DOCUMENTS

| | | | |
|---|---|---|---|
| 4,972,318 A | 11/1990 | Brown et al. | |
| 4,992,940 A | 2/1991 | Dworkin | |
| 5,109,482 A * | 4/1992 | Bohrman | 715/723 |
| 5,172,314 A | 12/1992 | Poland et al. | |
| 5,404,528 A | 4/1995 | Mahajan | |
| 5,640,569 A | 6/1997 | Miller et al. | |
| 5,652,850 A | 7/1997 | Hollander | |
| 5,664,111 A | 9/1997 | Nahan et al. | |
| 5,701,137 A | 12/1997 | Kiernan et al. | |
| 5,710,887 A | 1/1998 | Chelliah et al. | |
| 5,745,882 A | 4/1998 | Bixler et al. | |
| 5,784,539 A | 7/1998 | Lenz | |

(Continued)

FOREIGN PATENT DOCUMENTS

CA 2277848 10/1998
(Continued)

OTHER PUBLICATIONS

David Lucking-Reily; "Auctions on the Internet: What's Being Auctioned, and How?"; Aug. 14, 1999; pp. 1-55.*

(Continued)

Primary Examiner — Ella Colbert
(74) Attorney, Agent, or Firm — Schwegman, Lundberg & Woessner, P.A.

(57) ABSTRACT

A networked sales method is disclosed that includes presenting price choices to a user for an item on a sales screen via a network. Available supply and sales activity level information about actions by other users for the item for which the price choices are presented can be converted into a feedback indication, and this indication can be conveyed to the user on the sales screen. A variable price schedule for the item can also be communicated to the user, and a reminder command associated with an entry in the schedule can be received from the user, with the reminder command including a price selection for the item. The user can then be notified when the entry in the schedule is reached.

21 Claims, 10 Drawing Sheets

U.S. PATENT DOCUMENTS

| | | | |
|---|---|---|---|
| 5,809,242 A | 9/1998 | Shaw et al. | |
| 5,826,244 A * | 10/1998 | Huberman | 705/37 |
| 5,835,896 A | 11/1998 | Fisher et al. | |
| 5,845,265 A | 12/1998 | Woolston | |
| 5,890,138 A | 3/1999 | Godin et al. | |
| 5,894,554 A | 4/1999 | Lowery et al. | |
| 5,924,077 A | 7/1999 | Beach et al. | |
| 5,978,811 A | 11/1999 | Smiley | |
| 5,983,199 A | 11/1999 | Kaneko | |
| 5,991,739 A * | 11/1999 | Cupps et al. | 705/26.8 |
| 6,021,398 A | 2/2000 | Ausubel | |
| 6,029,141 A | 2/2000 | Bezos et al. | |
| 6,032,153 A | 2/2000 | Sadiq et al. | |
| 6,041,310 A | 3/2000 | Green et al. | |
| 6,052,667 A | 4/2000 | Walker | |
| 6,055,519 A | 4/2000 | Kennedy et al. | |
| 6,058,417 A | 5/2000 | Hess et al. | |
| 6,064,981 A | 5/2000 | Barni et al. | |
| 6,101,484 A | 8/2000 | Halbert et al. | |
| 6,119,152 A | 9/2000 | Carlin et al. | |
| 6,125,352 A | 9/2000 | Franklin et al. | |
| 6,134,548 A * | 10/2000 | Gottsman et al. | 705/26.9 |
| 6,182,053 B1 | 1/2001 | Rauber et al. | |
| 6,202,051 B1 | 3/2001 | Woolston | |
| 6,243,691 B1 | 6/2001 | Fisher et al. | |
| 6,253,188 B1 | 6/2001 | Witek et al. | |
| 6,260,024 B1 | 7/2001 | Shkedy | |
| 6,263,341 B1 | 7/2001 | Smiley | |
| 6,266,651 B1 | 7/2001 | Woolston | |
| 6,269,343 B1 * | 7/2001 | Pallakoff | 705/26.2 |
| 6,272,472 B1 | 8/2001 | Danneels et al. | |
| 6,285,989 B1 | 9/2001 | Shoham | |
| 6,295,058 B1 | 9/2001 | Hsu et al. | |
| 6,304,855 B1 | 10/2001 | Burke | |
| 6,314,424 B1 | 11/2001 | Kaczmarski et al. | |
| 6,332,124 B1 | 12/2001 | Loeb et al. | |
| 6,356,878 B1 | 3/2002 | Walker et al. | |
| 6,356,909 B1 | 3/2002 | Spencer | |
| 6,374,229 B1 | 4/2002 | Lowrey et al. | |
| 6,393,427 B1 | 5/2002 | Vu et al. | |
| 6,401,080 B1 | 6/2002 | Bigus et al. | |
| 6,405,175 B1 | 6/2002 | Ng | |
| 6,415,270 B1 | 7/2002 | Rackson et al. | |
| 6,434,536 B1 * | 8/2002 | Geiger | 705/37 |
| 6,473,609 B1 * | 10/2002 | Schwartz et al. | 455/406 |
| 6,473,748 B1 | 10/2002 | Archer | |
| 6,484,149 B1 * | 11/2002 | Jammes et al. | 705/26.62 |
| 6,496,568 B1 | 12/2002 | Nelson | |
| 6,499,052 B1 | 12/2002 | Hoang et al. | |
| 6,516,301 B1 * | 2/2003 | Aykin | 705/10 |
| 6,564,192 B1 | 5/2003 | Kinney, Jr. et al. | |
| 6,584,451 B1 | 6/2003 | Shoham et al. | |
| 6,587,837 B1 | 7/2003 | Spagna et al. | |
| 6,598,026 B1 | 7/2003 | Ojha et al. | |
| 6,606,608 B1 | 8/2003 | Bezos | |
| 6,611,881 B1 | 8/2003 | Gottfurcht et al. | |
| 6,658,568 B1 | 12/2003 | Ginter et al. | |
| 6,671,358 B1 | 12/2003 | Seidman et al. | |
| 6,671,818 B1 | 12/2003 | Mikurak | |
| 6,704,713 B1 | 3/2004 | Brett | |
| 6,731,729 B2 | 5/2004 | Eng et al. | |
| 6,754,181 B1 | 6/2004 | Elliott et al. | |
| 6,868,413 B1 | 3/2005 | Grindrod et al. | |
| 6,901,376 B1 | 5/2005 | Sculler et al. | |
| 6,910,028 B2 | 6/2005 | Chan et al. | |
| 7,010,511 B1 * | 3/2006 | Kinney et al. | 705/37 |
| 7,020,632 B1 | 3/2006 | Kohls et al. | |
| 7,039,594 B1 | 5/2006 | Gersting | |
| 7,039,608 B2 | 5/2006 | Johnson et al. | |
| 7,039,875 B2 | 5/2006 | Khalfay et al. | |
| 7,062,756 B2 | 6/2006 | Kamen et al. | |
| 7,069,242 B1 * | 6/2006 | Sheth et al. | 705/37 |
| 7,110,967 B1 | 9/2006 | Espenes et al. | |
| 7,120,629 B1 | 10/2006 | Seibel et al. | |
| 7,130,807 B1 | 10/2006 | Mikurak | |
| 7,133,834 B1 | 11/2006 | Abelow | |
| 7,149,698 B2 | 12/2006 | Guheen et al. | |
| 7,165,041 B1 | 1/2007 | Guheen et al. | |
| 7,185,044 B2 | 2/2007 | Ryan et al. | |
| 7,188,080 B1 | 3/2007 | Walker et al. | |
| 7,188,091 B2 | 3/2007 | Huelsman et al. | |
| 7,249,044 B2 | 7/2007 | Kumar et al. | |
| 7,249,055 B1 * | 7/2007 | Elder | 705/80 |
| 7,289,964 B1 | 10/2007 | Bowman-Amuah | |
| 7,289,967 B1 * | 10/2007 | Brader-Araje et al. | 705/26.3 |
| 7,308,423 B1 | 12/2007 | Woodward et al. | |
| 7,315,826 B1 | 1/2008 | Guheen et al. | |
| 7,363,246 B1 | 4/2008 | Van Horn et al. | |
| 7,505,932 B2 | 3/2009 | Kemp et al. | |
| 7,509,283 B2 | 3/2009 | Friesen et al. | |
| 7,558,752 B1 | 7/2009 | Ephrati et al. | |
| 7,587,350 B1 | 9/2009 | Stewart et al. | |
| 7,596,509 B1 | 9/2009 | Bryson | |
| 7,860,776 B1 | 12/2010 | Chin et al. | |
| 7,883,002 B2 | 2/2011 | Jin et al. | |
| 2001/0032170 A1 | 10/2001 | Sheth | |
| 2001/0043595 A1 | 11/2001 | Aravamudan et al. | |
| 2001/0047308 A1 | 11/2001 | Kaminsky et al. | |
| 2001/0051932 A1 | 12/2001 | Srinivasan et al. | |
| 2005/0114229 A1 | 5/2005 | Ackley et al. | |
| 2007/0112645 A1 | 5/2007 | Traynor et al. | |
| 2008/0133426 A1 | 6/2008 | Porat et al. | |

FOREIGN PATENT DOCUMENTS

| | | |
|---|---|---|
| CA | 2349913 | 2/2000 |
| CA | 2377939 | 12/2000 |
| EP | 1001355 A2 | 5/2000 |
| WO | WO-9914688 A2 | 3/1999 |
| WO | WO-0042558 A2 | 7/2000 |

OTHER PUBLICATIONS

Abstract; "User Interface for a PCS smart phone"; Narayanaswamy, S., Jianying Hu, and Kashi, R; AT&T Bell Labs; IEEE; Jul. 1999; p. 1.*

Shankar Narayanaswamy, Jianying Hu, and Ramanujan Kashi; "User Interface for a PCS Smart Phone"; Bell Laboratories; IEEE; Jul. 1999; pp. 777-781.*

Jon Ketcham, Vernon L. Smith, Arlington W. Williams; "A Comparison of Posted-Offer and Double-Auction Pricing Institutions"; Tthe Review of Economic Studies, vol. 51, No. 4; Oct. 1984; pp. 595-614.*

"U.S. Appl. No. 09/441,388, Amendment filed with RCE Nov. 1, 2007", 15 pgs.

"U.S. Appl. No. 09/441,388, Final Office Action Mailed Oct. 21, 2008", 12 pgs.

"U.S. Appl. No. 09/441,388, Advisory Action mailed Jan. 2, 2004", 3 pgs.

"U.S. Appl. No. 09/441,388, Advisory Action mailed Dec. 12, 2005", 3 pgs.

"U.S. Appl. No. 09/441,388, Final Office Action mailed Feb. 6, 2004", 8 pgs.

"U.S. Appl. No. 09/441,388, Final Office Action mailed Aug. 10, 2005", 9 pgs.

"U.S. Appl. No. 09/441,388, Non Final Office Action mailed Jun. 14, 2004", 9 pgs.

"U.S. Appl. No. 09/441,388, Response filed May 6, 2004 to Final Office Action mailed Feb. 6, 2004", 11 pgs.

"U.S. Appl. No. 09/441,388, Response filed Jul. 8, 2008 to Non-Final Office Action mailed Feb. 8, 2008", 22 pgs.

"U.S. Appl. No. 09/441,388, Response filed Sep. 13, 2004 to Non Final Office Action mailed Jun. 14, 2004", 11 pgs.

"U.S. Appl. No. 09/441,388, Response filed Nov. 4, 2005 to Final Office Action mailed Aug. 10, 2005", 10 pgs.

"U.S. Appl. No. 09/441,388, Response filed Dec. 12, 2003 to Final Office Action mailed Jun. 23, 2003", 5 pgs.

"U.S. Appl. No. 09/441,388, Response filed Jan. 21, 2009 to Final Office Action mailed Oct. 21, 2008", 16 pgs.

"U.S. Appl. No. 09/441,388, Non-Final Office Action Mailed Feb. 8, 2008", 3 pgs.

"U.S. Appl. No. 09/685,449, Non Final Office Action mailed Sep. 19, 2005", 13 pgs.

"U.S. Appl. No. 09/685,449, Non-Final Office Action mailed Sep. 24, 2007", 7 pgs.
"U.S. Appl. No. 09/685,449, Response filed Jan. 24, 2008 to Non-Final Office Action mailed Sep. 24, 2007", 12 pgs.
"U.S. Appl. No. 09/685,449, Advisory Action mailed Sep. 12, 2006", 3 pgs.
"U.S. Appl. No. 09/685,449, Final Office Action mailed Jan. 4, 2005", 8 pgs.
"U.S. Appl. No. 09/685,449, Final Office Action mailed Jun. 20, 2006", 16 pgs.
"U.S. Appl. No. 09/685,449, Non Final Office Action mailed Mar. 2, 2006", 4 pgs.
"U.S. Appl. No. 09/685,449, Non Final Office Action mailed Jun. 14, 2004", 9 pgs.
"U.S. Appl. No. 09/685,449, Response filed Mar. 1, 2005 to Final Office Action mailed Jan. 4, 2005", 18 pgs.
"U.S. Appl. No. 09/685,449, Response filed Aug. 21, 2006 to Final Office Action mailed Jun. 20, 2006", 13 pgs.
"U.S. Appl. No. 09/685,449, Response filed Sep. 27, 2004 to Non Final Office Action mailed Jun. 14, 2004", 13 pgs.
"U.S. Appl. No. 09/685,449, Response filed Nov. 30, 2005 to Non Final Office Action mailed Sep. 19, 2005", 12 pgs.
"U.S. Appl. No. 09/685,449, Restriction Requirement mailed May 13, 2008", 7 pgs.
"U.S. Appl. No. 09/686,073, Final Office Action mailed Nov. 5, 2007", 13 pgs.
"U.S. Appl. No. 09/686,073, Response filed Jan. 8, 2008 to Final Office Action mailed Nov. 5, 2007", 10 pgs.
"U.S. Appl. No. 09/686,073, Response filed Jun. 17, 2008 to Non-Final Office Action mailed Mar. 17, 2008", 10 pgs.
"U.S. Appl. No. 09/686,073, Advisory Action mailed Apr. 12, 2005", 2 pgs.
"U.S. Appl. No. 09/686,073, Final Office Action mailed Feb. 6, 2006", 15 pgs.
"U.S. Appl. No. 09/686,073, Non Final Office Action mailed Mar. 29, 2004", 11 pgs.
"U.S. Appl. No. 09/686,073, Non Final Office Action mailed May 8, 2007", 23 pgs.
"U.S. Appl. No. 09/686,073, Non Final Office Action mailed Aug. 12, 2005", 12 pgs.
"U.S. Appl. No. 09/686,073, Non Final Office Action mailed Oct. 5, 2006", 12 pgs.
"U.S. Appl. No. 09/686,073, Non Final Office Action mailed Nov. 5, 2004", 8 pgs.
"U.S. Appl. No. 09/686,073, Response filed Jan. 25, 2007 to Non Final Office Action mailed Oct. 5, 2006", 14 pgs.
"U.S. Appl. No. 09/686,073, Response filed Mar. 24, 2005 to Non Final Office Action mailed Nov. 5, 2004", 8 pgs.
"U.S. Appl. No. 09/686,073, Response filed Jul. 29, 2004 to Non Final Office Action mailed Mar. 29, 2004", 10 pgs.
"U.S. Appl. No. 09/686,073, Response filed Nov. 14, 2005 to Non Final Office Action mailed Aug. 12, 2005", 9 pgs.
"U.S. Appl. No. 09/686,073, Non-Final Office Action mailed Mar. 17, 2008", 24 Pgs.
"U.S. Appl. No. 10/201,586, Final Office Action mailed Apr. 15, 2008", 10 pgs.
"U.S. Appl. No. 10/201,586, Non-Final Office Action mailed Oct. 10, 2008", 4 pgs.
"U.S. Appl. No. 10/201,586, Response filed Jan. 9, 2009 to Non-Final Office Action mailed Oct. 10, 2008", 7 pgs.
"U.S. Appl. No. 10/201,586, Final Office Action mailed Nov. 20, 2006", 8 pgs.
"U.S. Appl. No. 10/201,586, Non Final Office Action mailed Apr. 6, 2006", 7 pgs.
"U.S. Appl. No. 10/201,586, Non Final Office Action mailed May 9, 2007", 10 pgs.
"U.S. Appl. No. 10/201,586, Response filed Aug. 8, 2007 to Non Final Office Action mailed May 9, 2007", 16 pgs.
"U.S. Appl. No. 10/201,586, Response filed Aug. 22, 2006 to Non Final Office Action mailed Apr. 6, 2006", 6 pgs.
"U.S. Appl. No. 10/201,586, Notice of Allowance mailed Sep. 9, 2008", 6 Pgs.

"U.S. Appl. No. 11/027,735, Notice of Allowance mailed Apr. 3, 2008", NOAR, 7 pgs.
"U.S. Appl. No. 11/027,735, Response filed Jan. 2, 2009 to Non-Final Office Action mailed Oct. 2, 2008", 8 pgs.
"U.S. Appl. No. 11/027,735, Non-Final Office Action mailed Oct. 2, 2008", 7 pgs.
"U.S. Appl. No. 11/648,307, Response filed Nov. 11, 2008 to Non-Final Office Action mailed Aug. 25, 2008", 9 pgs.
"U.S. Appl. No. 11/648,307, Preliminary Amendment mailed Dec. 29, 2006", 3 pgs.
"U.S. Appl. No. 11/648,307, Response filed Apr. 17, 2008 to Restriction Requirement mailed Mar. 17, 2008", 6 pgs.
"U.S. Appl. No. 11/648,307, Restriction Requirement mailed Mar. 17, 2008", 7 pgs.
"U.S. Appl. No. 11/648,307, Final Office Action mailed Feb. 23, 2009", 10 pgs.
"U.S. Appl. No. 11/648,307, Non-Final Office Action mailed Aug. 25, 2008", 9 pgs.
"Chinese Application No. 02818562.5, Office Action Mailed Dec. 5, 2008", 4 pgs.
"European Application Serial No. 01986779.5, Office Action Mailed Dec. 3, 2008", 9 pgs.
"European Application Serial No. 01986779.5, Supplemental European Search Report mailed Jul. 9, 2008", 3 pgs.
Lucking-Reiley, David, "Auctions On the Internet: What's Being Auctioned, and How?", *JEL: D44 (Auctions)*, (Aug. 14, 1999), pp. 1-55.
Ubid.com; http://www.ubid.com/category/listing.aspx?catid=O&uwb=uwb63174&AID=10297033&PID=799335, (Jul. 11, 2000), 1-12 Pages.
"U.S. Appl. No. 09/441,388, Appeal Brief filed Jan. 9, 2006", 21 pgs.
"U.S. Appl. No. 09/441,388, Examiner's Answer mailed Apr. 5, 2006", 10 pgs.
"U.S. Appl. No. 09/441,388, Final Office Action mailed Jun. 23, 2003", 7 pgs.
"U.S. Appl. No. 09/441,388, Final Office Action mailed Dec. 31, 2002", 12 pgs.
"U.S. Appl. No. 09/441,388, Non Final Office Action mailed Mar. 19, 2009", 21 pgs.
"U.S. Appl. No. 09/441,388, Non Final Office Action mailed Jun. 5, 2002", 11 pgs.
"U.S. Appl. No. 09/441,388, Response filed Mar. 15, 2005 to Non Final Office Action mailed Jul. 14, 2004", 15 pgs.
"U.S. Appl. No. 09/441,388, Response filed May 28, 2003 to Final Office Action mailed Dec. 31, 2002", 7 pgs.
"U.S. Appl. No. 09/441,388, Response filed Oct. 7, 2002 to Non Final Office Action mailed Jun. 3, 2002", 7 pgs.
"U.S. Appl. No. 09/441,388, Response filed Jul. 20, 2009 to Non Final Office Action mailed Mar. 19, 2009", 21 pgs.
"U.S. Appl. No. 09/685,449 Non-Final Office Action Mailed May 27, 2009", 26 pgs.
"U.S. Appl. No. 09/685,449, Response filed Mar. 29, 2006 to Non Final Office Action mailed Mar. 2, 2006", 7 pgs.
"U.S. Appl. No. 09/685,449, Response filed Jun. 20, 2005 to Restriction Requirement mailed May 19, 2005", 8 pgs.
"U.S. Appl. No. 09/685,449, Response filed Aug. 13, 2008 to Restriction Requirement mailed May 13, 2008", 9 pgs.
"U.S. Appl. No. 09/685,449, Response filed Dec. 12, 2003 to Restriction Requirement mailed Sep. 17, 2003", 10 pgs.
"U.S. Appl. No. 09/685,449, Restriction Requirement mailed May 19, 2005", 5 pgs.
"U.S. Appl. No. 09/685,449, Restriction Requirement mailed Sep. 17, 2003", 5 pgs.
"U.S. Appl. No. 09/686,073 , Restriction Requirement mailed Mar. 5, 2009", 6 pgs.
"U.S. Appl. No. 09/686,073, Non-Final Office Action mailed Jun. 30, 2009", 10 Pgs.
"U.S. Appl. No. 09/686,073, Response filed Apr. 6, 2009 to Restriction Requirement mailed Mar. 5, 2009", 7 pgs.
"U.S. Appl. No. 09/686,073, Response filed Jul. 6, 2006 to Final Office Action mailed Feb. 6, 2006", 10 pgs.
"U.S. Appl. No. 09/686,073, Response filed Nov. 20, 2008 to Non Final Office Action mailed Oct. 21, 2008", 6 pgs.

"U.S. Appl. No. 09/686,073, Response filed Dec. 19, 2003 to Restriction Requirement mailed Oct. 3, 2003", 5 pgs.

"U.S. Appl. No. 09/686,073, Restriction Requirement mailed Oct. 3, 2003", 4 pgs.

"U.S. Appl. No. 10/201,586, Advisory Action mailed Jul. 6, 2009", 3 pgs.

"U.S. Appl. No. 10/201,586, Final Office Action mailed Apr. 29, 2009", 5 pgs.

"U.S. Appl. No. 10/201,586, Non Final Office Action mailed Oct. 15, 2009", 5 pgs.

"U.S. Appl. No. 10/201,586, Pre-Appeal Brief Request for Review mailed Jul. 29, 2009", 4 pgs.

"U.S. Appl. No. 10/201,586, Response filed Jan. 17, 2006 to Restriction Requirement mailed Dec. 15, 2005", 7 pgs.

"U.S. Appl. No. 10/201,586, Response filed Feb. 1, 2007 to Final Office Action mailed Nov. 20, 2006", 12 pgs.

"U.S. Appl. No. 10/201,586, Response filed May 15, 2008 to Final Office Action mailed Apr. 15, 2008", 14 pgs.

"U.S. Appl. No. 10/201,586, Response filed Jun, 17, 2009 to Final Office Action mailed Apr. 29, 2009", 9 pgs.

"U.S. Appl. No. 10/201,586, Restriction Requirement mailed Dec. 15, 2005", 4 pgs.

"U.S. Appl. No. 11/027,735, Appeal Brief Filed Oct. 14, 2009", 26 pgs.

"U.S. Appl. No. 11/027,735, Final Office Action mailed Apr. 14, 2009", 13 pgs.

"U.S. Appl. No. 11/027,735, Preliminary Amendment mailed Jan. 26, 2005", 4 pgs.

"U.S. Appl. No. 11/027,735, Preliminary Amendment mailed Dec. 30, 2004", 3 pgs.

"U.S. Appl. No. 11/648,307, Non Final Office Action Mailed Aug. 20, 2009", 10 pgs.

"U.S. Appl. No. 11/648,307, Response filed Apr. 23, 2009 to final Office Action mailed Feb. 23, 2009", 9 pgs.

"Canadian Application Serial No. 2,455,639, Office Action mailed Jul. 20, 2009", 5 pgs.

"Chinese Application Serial No. 02818562.5, Office Action mailed Jun. 19, 2009", 5 pgs.

"European Application Serial No. 02752516.1, Office Action mailed Feb. 20, 2009", 3 pgs.

Anonymous, "Standard on ratio studies", *Assessment Journal*, (1999), 1-74.

Elliott, S R, "Innovative Rate Structures for Electrical Utility peak Load Management: An Experimental Approach", *University of Colorado at Boulder*, (1990), p. 1.

Ketcham, J, et al., "A Comparison of Posted-Offer and Double-Auction Pricing Institutions", *The Review of Economic Studies*; vol. 51, No. 4, (Oct. 1984), 595-614 Pages.

Rittenhouse, R C, "Action builds on 1990 Clean Air Act compliance", Power Engineering v96, n5, (May 1992), 1-6 Pages.

Timothy, S V, "A model of the Perishable Inventory System with Reference to Consumer-Realized Product Expiration", *The journal of the Operational Research Society*; vol. 45, No. 5, (May 1991), 519-528 Pages.

William Jr., P, et al., "Toy Story", *Barron's*, v79, n52;, (Dec. 27, 1999), 1-4.

U.S. Appl. No. 09/441,388, Advisory Action mailed Jan. 28, 2010, 3 pgs.

U.S. Appl. No. 09/441,388, Final Office Action mailed Oct. 30, 2009, 24 pgs.

U.S. Appl. No. 09/441,388, Response filed Feb. 1, 2010 to Advisory Action mailed Jan. 28, 2010, 17 pgs.

U.S. Appl. No. 09/441,388, Response filed Dec. 30, 2009 to Final Office Action mailed Oct. 30, 2009, 17 pgs.

U.S. Appl. No. 09/685,449, Final Office Action mailed Jan. 22, 2010, 23 pgs.

U.S. Appl. No. 09/685,449, Pre-Appeal Brief Request filed Nov. 20, 2006, 5 pgs.

U.S. Appl. No. 09/685,449, Response filed Oct. 27, 2009 to Non Final Office Action mailed May 27, 2009, 11 pgs.

U.S. Appl. No. 09/686,073, Examiner Interview Summary mailed May 22, 2008, 3 pgs.

U.S. Appl. No. 10/201,586, Examiner Interview Summary mailed May 13, 2008, 2 pgs.

U.S. Appl. No. 10/201,586, Final Office Action mailed Mar. 25, 2010, 10 pgs.

U.S. Appl. No. 10/201,586, Response filed Jan. 15, 2010 to Non Final Office Action mailed Oct. 15, 2009, 11 pgs.

U.S. Appl. No. 11/027,735, Supplemental Appeal Brief filed Feb. 4, 2010, 24 pgs.

U.S. Appl. No. 11/648,307, Advisory Action mailed May 8, 2009, 3 pgs.

U.S. Appl. No. 11/648,307, Examiner Interview Summary mailed Mar. 30, 2009, 2 pgs.

"U.S. Appl. No. 09/441,388, Non Final Office Action mailed Aug. 19, 2010", 22 pgs.

"U.S. Appl. No. 09/441,388, Non-Final Office Action mailed Aug. 19, 2010", 23 pgs.

"U.S. Appl. No. 09/441,388, Response filed Feb. 1, 2010 to Advisory Action mailed Jan. 28, 2010", 17 pgs.

"U.S. Appl. No. 09/441,388, Response filed Dec. 17, 2010 to Non Final Office Action mailed Aug. 19, 2010", 18 pgs.

"U.S. Appl. No. 09/685,449, Notice of Allowance mailed Jul. 21, 2010", 14 pgs.

"U.S. Appl. No. 09/685,449, Response filed May 24, 2010 to Final Office Action mailed Jan. 22, 2010", 9 pgs.

"U.S. Appl. No. 10/201,586, Decision on Pre-Appeal Brief Request mailed Jul. 27, 2010", 2 pgs.

"U.S. Appl. No. 10/201,586, Pre-Appeal Brief Request filed Jun. 23, 2010", 5 pgs.

"U.S. Appl. No. 10/201,586, Response filed Jun. 23, 2010 to Final Office Action mailed Mar. 25, 2010", 7 pgs.

"U.S. Appl. No. 11/027,735, Decision on Supplemental Appeal Brief mailed Aug. 19, 2010", 10 pgs.

"U.S. Appl. No. 11/027,735, Supplemental Appeal Brief filed Jun. 25, 2010", 25 pgs.

"U.S. Appl. No. 10/201,586, Notice of Allowance mailed Sep. 30, 2010", 6 pgs.

"Chinese Application Serial No. 02818562.5,Office Action mailed on Aug. 20, 2010", 4pgs.

"Chinese Application Serial No. 02818562.5,Office Action Response Filed on Nov. 4, 2010", 9 pgs.

"Mercata—Greoup Buying Power", http://mercata.com.

"Onedayfree-B2B product exchange powered by the Dynamic Price Calendar Auction", http://www.onedayfree.com, Downloaded from http://web.archive.org/web/20001007030239/http://www.onedayfree.com/,(2000).

"Priceline.com airline tickets", http://www.pricline.com/travel/airlines.

"A Beginner's Guide to URLs", [Online]. Retrieved from the Internet: <URL: http://archive.nesa.uiuc.edu/demoweb/url-primer.html>, (2002), 2 pgs.

"U.S. Appl. No. 09/441,385, Non Final Office Action mailed Apr. 9, 2002", 10 pgs.

"U.S. Appl. No. 09/441,385, Response filed Jul. 9, 2002 to Non Final Office Action mailed Apr. 9, 2002", 10 pgs.

"U.S. Appl. No. 09/441,388, Final Office Action mailed Mar. 25, 2011", 23 pgs.

"U.S. Appl. No. 09/441,388, Non Final Office Action mailed Jul. 20, 2011", 22 pgs.

"U.S. Appl. No. 09/441,388, Response filed May 17, 2011 to Final Office Action mailed Mar. 25, 2011", 21 pgs.

"U.S. Appl. No. 09/441,616, Non Final Office Action mailed Jul. 27, 2001", 6 pgs.

"U.S. Appl. No. 09/441,617, Non Final Office Action mailed Jan. 31, 2002", 5 pgs.

"Chinese Application No. 02818562.5—Office Action Received", 8 pgs.

"Welcome to the ODBC Section of the Microsoft Universal Data Access Web Site", (2001), 1 pg.

Brain, Marshall, "How Domain Servers Work", [Online]. Retrieved from the Internet: <URL: http://www.howstuffworks.com/dns.htm/printable>, (2002), 9 pgs.

Monkey, W. T., "Intro to HTML", [Online]. Retrieved from the Internet: <URL: http://hotwired.lycos.com/webmonkey/96/53/index.html?tw=authoring>, (2001), 22 pgs.

"Amazon.com: http://www.amazon.com/Carbohydrate-Additcs-Lifespan-Parogram-personalized/dp/0525941", (Jan. 1, 2007).

"U.S. Appl. No. 09/686,073, Response filed Jul. 31, 2007 to Non-Final Office Action mailed May 8, 2007", 16 pgs.

"Australian Application No. 2002355130 First Office Action and communication regarding same", 1 pg.

"U.S. Appl. No. 10/201,586, Response filed Aug. 8, 2007 to Non-Final Office Action mailed May 9, 2007.", 16 pgs.

* cited by examiner

| USA OLYMPIC BRAND NYLON WARMUPS SIZE: XL COLOR: NAVY/G | | | | BUY IT NOW! | |
|---|---|---|---|---|---|
| RETAIL PRICE: | $39.99 | OPEN DATE: | 8/11/00 3 AM EDT | | |
| OPENING PRICE: | $36.99 | CLOSE DATE: | 8/16/00 8 AM EDT | | |
| CURRENT PRICE: | $14.80 | LISTING #: | 16743131 | | |

| TIME | PRICE | % OFF | DEMAND | CHANCE OF WINNING | |
|---|---|---|---|---|---|
| AUG 15TH 7:00 PM | $35.00 | 14 % | | HIGH | |
| AUG 16TH 7:00 AM | $25.00 | 30 % | | HIGH | BUY IT NOW! |
| AUG 16TH 7:00 PM | $20.00 | 50 % | | GOOD | BUY IT THEN |
| AUG 17TH 7:00 AM | $15.00 | 60 % | | FAIR | BUY IT THEN |
| AUG 17TH 7:00 PM | $10.00 | 75 % | | POOR | BUY IT THEN |
| AUG 18TH 7:00 AM | $5.00 | 86 % | | SNOWB | BUY IT THEN |

I REALLY WANT THIS- I WILL BUY ONE OF THE LAST ITEMS UPTO $ 15.00   BUY IT THEN

SHIPPING INFO    ✉ EMAIL THIS TO A FRIEND    FALLING PRICE NOTIFIER WHAT IS THIS?

*FIG. 2*

| | | | |
|---|---|---|---|
| USA OLYMPIC BRAND NYLON WARMUPS SIZE: XL COLOR: NAVY/G | | | BUY IT NOW! |
| RETAIL PRICE: | $39.99 | OPEN DATE: | 8/11/00 3 AM EDT |
| OPENING PRICE: | $36.99 | CLOSE DATE: | 8/16/00 8 AM EDT |
| CURRENT PRICE: | $14.80 | LISTING #: | 16743131 |

| TIME (EASTERN) | PRICE | % OFF | DEMAND | CHANCE OF WINNING | |
|---|---|---|---|---|---|
| AUG 15TH 7:00 PM | $35.00 | 14 % | | HIGH | |
| AUG 16TH 7:00 AM | $25.00 | 30 % | | HIGH | BUY IT NOW! |
| AUG 16TH 7:00 PM | $20.00 | 50 % | | GOOD | BUY IT THEN |
| AUG 16TH 9:00 PM | $15.00 | 60 % | | POOR | BUY IT THEN |
| AUG 17TH 7:00 AM | $10.00 | 75 % | | POOR | BUY IT THEN |
| AUG 17TH 1:00 AM | ~~$5.00~~ | 86 % | | SOLD OUT AT THIS PRICE | |

I REALLY WANT THIS— I WILL BUY ONE OF THE LAST ITEMS UPTO $ 15.00   BUY IT THEN

SHIPPING INFO    ✉ EMAIL THIS TO A FRIEND    FALLING PRICE NOTIFIER WHAT IS THIS?

*FIG. 3*

| | | | |
|---|---|---|---|
| USA OLYMPIC BRAND NYLON WARMUPS SIZE: XL COLOR: NAVY/G | | | BUY IT NOW! |
| RETAIL PRICE: | $39.99 | OPEN DATE: | 8/11/00 3 AM EDT |
| OPENING PRICE: | $36.99 | CLOSE DATE: | 8/16/00 8 AM EDT |
| CURRENT PRICE: | $14.80 | LISTING #: | 16743131 |

| TIME | PRICE | % OFF | STATUS | CHANCE OF WINNING | |
|---|---|---|---|---|---|
| AUG 15TH 7:00 PM | $35.00 | 14 % | | 100% | |
| AUG 15TH 7:00 PM | $25.00 | 30 % | | 100% | |
| AUG 15TH 7:00 PM | $20.00 | 50 % | | 100% | BUY IT NOW! |
| AUG 15TH 7:00 PM | $15.00 | 60 % | | 50% | BUY IT THEN |
| AUG 15TH 7:00 PM | $10.00 | 75 % | | 10% | BUY IT THEN |
| AUG 15TH 7:00 PM | ~~$5.00~~ | 86 % | | SOLD OUT AT THIS PRICE | |

I REALLY WANT THIS— I WILL BUY ONE OF THE LAST ITEMS UPTO $ 15.00    BUY IT THEN

SHIPPING INFO     EMAIL THIS TO A FRIEND    FALLING PRICE NOTIFIER WHAT IS THIS?

*FIG. 4*

USA OLYMPIC BRAND NYLON WARMUPS SIZE: XL COLOR: NAVY/G          BUY IT NOW!

| RETAIL PRICE: | $39.99 | OPEN DATE: | 8/11/00 3 AM EDT |
|---|---|---|---|
| OPENING PRICE: | $36.99 | CLOSE DATE: | 8/16/00 8 AM EDT |
| CURRENT PRICE: | $14.80 | LISTING #: | 16743131 |

| TIME | PRICE | % OFF | DEMAND | CHANCE OF WINNING | | |
|---|---|---|---|---|---|---|
| AUG 15TH 7:00 PM | $35.00 | 14 % | | HIGH | | |
| AUG 16TH 7:00 AM | $25.00 | 30 % | | HIGH | BUY IT NOW! | |
| AUG 16TH 7:00 PM | $20.00 | 50 % | | GOOD | BUY IT THEN | CALL ME! |
| AUG 16TH 7:00 AM | $15.00 | 60 % | | FAIR | BUY IT THEN | CALL ME! |
| AUG 17TH 7:00 PM | $10.00 | 75 % | | POOR | BUY IT THEN | CALL ME! |
| AUG 18TH 7:00 AM | $5.00 | 86 % | | SNOWB | BUY IT THEN | CALL ME! |

I REALLY WANT THIS- I WILL BUY ONE OF THE LAST ITEMS UPTO $ 15.00      BUY IT THEN

SHIPPING INFO      ✉ EMAIL THIS TO A FRIEND      FALLING PRICE NOTIFIER WHAT IS THIS?

SALES SYSTEM WITH BUYER PRICE SELECTION

CROSS-REFERENCE TO RELATED APPLICATION

This application is a continuation of U.S. patent application Ser. No. 09/685,449 filed Oct. 11, 2000, now U.S. Pat. No. 7,860,776 and is related to copending U.S. patent application Ser. No. 09/686,073 filed Oct. 11, 2000, both of which are herein incorporated by reference.

FIELD OF THE INVENTION

This invention relates to computer-based systems and methods that enable sales transactions through a communications network.

BACKGROUND OF THE INVENTION

There are a variety of different types of network-based sales systems now in existence. A number of these implement the traditional English auction. This mechanism efficiently allocates individual lots by awarding them to the buyers who attribute the most value to them. But English auctions are not necessarily an optimum mechanism for selling larger quantities of goods, such as seasonal retail items, overstock, or discontinued merchandise, and these types of goods are therefore often sold using other types of electronic sales systems.

The simplest of these alternate systems strive to reproduce an in-store shopping experience in which goods are offered for sale at a particular non-negotiable markdown price. This approach requires sellers to gauge the demand for their products so that they can determine a price that is high enough to allow them an acceptable return, but not so high that few or no buyers will purchase them. This process can be difficult and time consuming, and may be too much so to be warranted for relatively small lots of goods. And setting a particular price can also allow some individuals who place a high value on an item to buy it for less than that value.

So-called Request-for-Proposal (RFP) systems allow buyers to place bids, which sellers can then choose to satisfy. These systems can allow sellers to provide the same goods to buyers who value them differently and thereby improve their profit levels. And although at least one system warns users against bids that are too low, such systems can be daunting to some buyers because they must thoroughly understand the value and demand for the item, or risk submitting bids that are too high.

Falling-price systems drop the price of goods over time until they are sold. Buyers can commit to buy early, or wait for a lower price at the risk of losing the item. At least one such system allows a user to pay a premium to place firm bids for later days using a so-called buyer's agent. Like RFP systems, falling-price systems can allow sellers to provide the same goods to buyers who value them differently. But they can also be daunting to some buyers, who must thoroughly understand the value and demand for the item, or risk submitting bids that are too high.

The network-based sales mechanisms described so far are by no means the only ones currently available to buyers and sellers. Others include Dutch auctions, sealed bid auctions, and classifieds. But no single one of all of these different mechanisms appears to present an optimum solution for selling larger lots of goods, such as seasonal retail items, overstock, or discontinued merchandise.

SUMMARY OF THE INVENTION

In one general aspect, the invention features a networked sales method that includes presenting via a first network an item on a sales screen to a user. A variable price schedule for the item is communicated to the user, and a reminder command associated with an entry in the schedule is received from him or her, with the reminder command including a price selection for the item. The user is then notified when the entry in the schedule is reached.

In preferred embodiments, the entry can be a price entry and the step of notifying can notify the user when the price entry is reached. The entry can be a date entry and the step of notifying can notify the user when the date entry is reached. The step of notifying can notify the user through a second network with a near-real-time alerting mechanism. The step of notifying can notify the user through a wireless network. The step of notifying can include a step of presenting a purchase acceptance control to the user. The step of notifying can notify the user through a telephone network, and the step of presenting a purchase acceptance control can request that the user signal acceptance using dial keys for a telephone connected to the telephone network. Acceptance of the reminder command in the step of receiving a reminder command from the user can be contingent on the receipt of contact information in a step of receiving contact information for the user, but with the step of presenting the item being independent of the receipt of any contact information from the user. The step of receiving a reminder command can be responsive to only a single click on a reminder control. The step of presenting can further present a plurality of time-separated price choices from a falling-price schedule. The step of presenting can further present a plurality of price choices including a present price and at least one future price, and the method can further include the step of displaying a present purchase control button next to the present price and a future purchase control button next to the future price.

In another general aspect, the invention features a network sales system for use in communicating with a sales server via a network that includes an item identification area in a first terminal and responsive to the sales server via the network, and a plurality of reminder request controls in the first terminal for the same item identified in the item identification area and having outputs provided to the sales server via the network.

In preferred embodiments, the system can further include an alert signal generator in a second terminal, with the alert signal generator being also responsive to the sales server. The system can further include a reminder purchase offer control responsive to the sales server. The reminder request controls can be responsive to only a single click on a reminder control. The item identification area can be operative to present a series of time-separated future price choices from a falling-price schedule, with the future time-separated price choices are each associated with a one of the plurality of reminder request controls.

In a further general aspect, the invention features a networked sales system, comprising means for presenting via a first network an item on a sales screen to a user, means for communicating a variable price schedule for the item to the user, means for receiving a reminder command from the user associated with an entry in the schedule, the reminder command including a price selection for the item, and means for notifying the user when the entry in the schedule is-reached.

In another general aspect, the invention features a networked sales method that includes presenting via a first network an item on a sales screen, receiving a supply-driven agent command from a user for the item, and awarding the item to the user when predetermined supply conditions are reached for the item.

In preferred embodiments, the step of receiving a supply-driven agent command can receive a maximum price amount with the step of awarding only awarding the item if the price does not exceed maximum price amount. The maximum price amount can be used to resolve conflicts between supply-driven agent commands received from different users. The step of monitoring the supply conditions can operate continuously in near real time. The step of presenting can present a plurality of time-separated price choices from a falling-price schedule. The step of presenting a plurality of price choices can display a present price and at least one future price, and the method can further include the step of displaying a present purchase control button next to the present price and a future purchase control button next to the future price.

In a further general aspect, the invention features a network sales terminal for use in communicating with a sales server via a network that includes an item identification area responsive to the sales server via the network, and a supply-driven agent control for the item identified in the item identification area and having an output provided to the sales server via the network.

In preferred embodiments, the supply-driven agent control can include a maximum amount selector and a submission control. The item identification area can present a plurality of time-separated price choices from a falling-price schedule. The terminal can further include a present purchase control button next to a present price in the plurality of time-separated price choices and a future purchase control button next to a future price in the plurality of time-separated price choices.

In another general aspect, the invention features a networked sales system that includes means for presenting via a first network an item on a sales screen, means for receiving a supply-driven agent command from a user for the item, and means for awarding the item to the user when predetermined supply conditions are reached for the item.

In a further general aspect, the invention features a networked sales method that includes displaying an item identifier for an item on a sales screen, displaying a price box for the item on the sales screen, and displaying via a first network a plurality of price choices for the item in the price box.

In preferred embodiments, the step of displaying an item identifier can include a step of displaying an image of the item on the sales screen and the step of displaying a price box can display the price box proximate the image of the item. The step of displaying an item identifier can include a step of displaying an image on the sales screen with the step of displaying a price box displaying the price box to overlap the image of the item. The step of displaying a plurality of price choices can display the plurality of choices as a series of user price selection controls. The step of displaying a plurality of price choices can display at least one of the user price selection controls as a control that is responsive to a single actuation to place a bid on the item. The step of displaying a plurality of price choices can display at least one of the plurality of choices as a user price selection control that is responsive to a single actuation to place a bid on the item. The price box can have one curved edge. The price box can have a circular marking near one of its edges. The method can further include further steps of displaying price boxes for different items and further steps of displaying price choices for those items on the same screen. The method can further include a step of displaying an image for each of the items on the sales screen. The method can further include the step of displaying further price information for the item in response to user interaction with the price box. The step of displaying further price information can display the information in a window that overlays an area of the screen in which the price box and the item identifier are displayed. The step of displaying can be responsive to the user locating a pointing device cursor above a screen area associated with the item. The price box can further include an accessorize button that is responsive to user input to retrieve information about items available that complement the item for which the price box is displayed. The step of displaying a plurality of price choices can display a present price and a present purchase control button next to it. The step of displaying a plurality of price choices can display a future price and a future purchase control button next to it. The step of displaying a plurality of price choices can display the plurality of choices as a series of displayed price values each located proximate one of a plurality of purchase control buttons, with the plurality of purchase control buttons including at least one present purchase control button and at least one future purchase control button. The step of displaying a plurality of price choices can display the plurality of choices a series of displayed price values each located proximate one of a plurality of purchase control buttons.

In another general aspect, the invention features a network sales terminal for use in communicating with a sales server via a network that includes an item identification area responsive to the sales server via the network, a plurality of price choice selection controls for the item identified in the item identification area and having outputs provided to the sales server via the network, and a price box substantially surrounding the plurality of price choice selection controls.

In a another general aspect, the invention features a networked sales system that includes means for displaying an item identifier for an item on a sales screen, means for displaying a price box for the item on the sales screen, and means for displaying via a first network a plurality of price choices for the item in the price box.

Systems according to the invention may be beneficial in that they can provide feedback about the ongoing sale of a number of goods. This feedback can allow the user to better understand the odds involved in selecting a price for a purchase. The feedback may also allow the system to adjust one or more of its offers, increasing the likelihood that sellers will sell their items at higher prices.

Systems according to the invention can also allow a user to select a price at which they will remind the user of his or her selection. This allows a user to visit a sales site once, make a decision about a particular item, and then forget about it. He or she does not need to remember to check the site again. If the item becomes available at the desired price, the user can be notified immediately and be given the option to respond to the notification with an automated purchase request. But if he or she finds a better price on a comparable item, or changes his or her mind about the item, he or she can simply decline or ignore the notification. Even if the user does not return, systems according to the invention may have received valuable contact information about the user as part of the process of selecting a reminder price.

Systems according to the invention may be further advantageous in that they can present their prices in a practical and understandable manner. By placing a selection of prices in an intuitive price box, which can be placed near an image of the item, users can immediately understand their options and take action on these options. And by providing for immediate bidding and/or reminder requests, systems according to the invention can enable the user to efficiently take action on a large number of items in a short period of time.

BRIEF DESCRIPTION OF THE DRAWINGS

FIG. 2 is a buyer's terminal screen view of an illustrative item pricing window in quantitative feedback mode for an item for sale on the network sales system of FIG. 1 at a first point in time on the second day of a sale;

FIG. 3 is a buyer's terminal screen view of the item pricing window of FIG. 2 in qualitative feedback mode at a second point in time on the second day of the sale after several sales transactions on that day;

FIG. 4 is a buyer's terminal screen view of the item pricing window of FIG. 2 in quantitative feedback mode at a third point in time on the second day of the sale after several reservation transactions on that day;

FIG. 7 is a buyer's terminal screen view of an illustrative item pricing window in quantitative feedback mode with reservations enabled for the item for sale on the network sales system of FIG. 1 at the first point in time on the second day of the sale;

FIG. 9 is a buyer's terminal view of the catalog window of FIG. 8 showing a revealed detail window for one of the items displayed in the catalog view.

DESCRIPTION OF AN ILLUSTRATIVE EMBODIMENT

Figure 1:
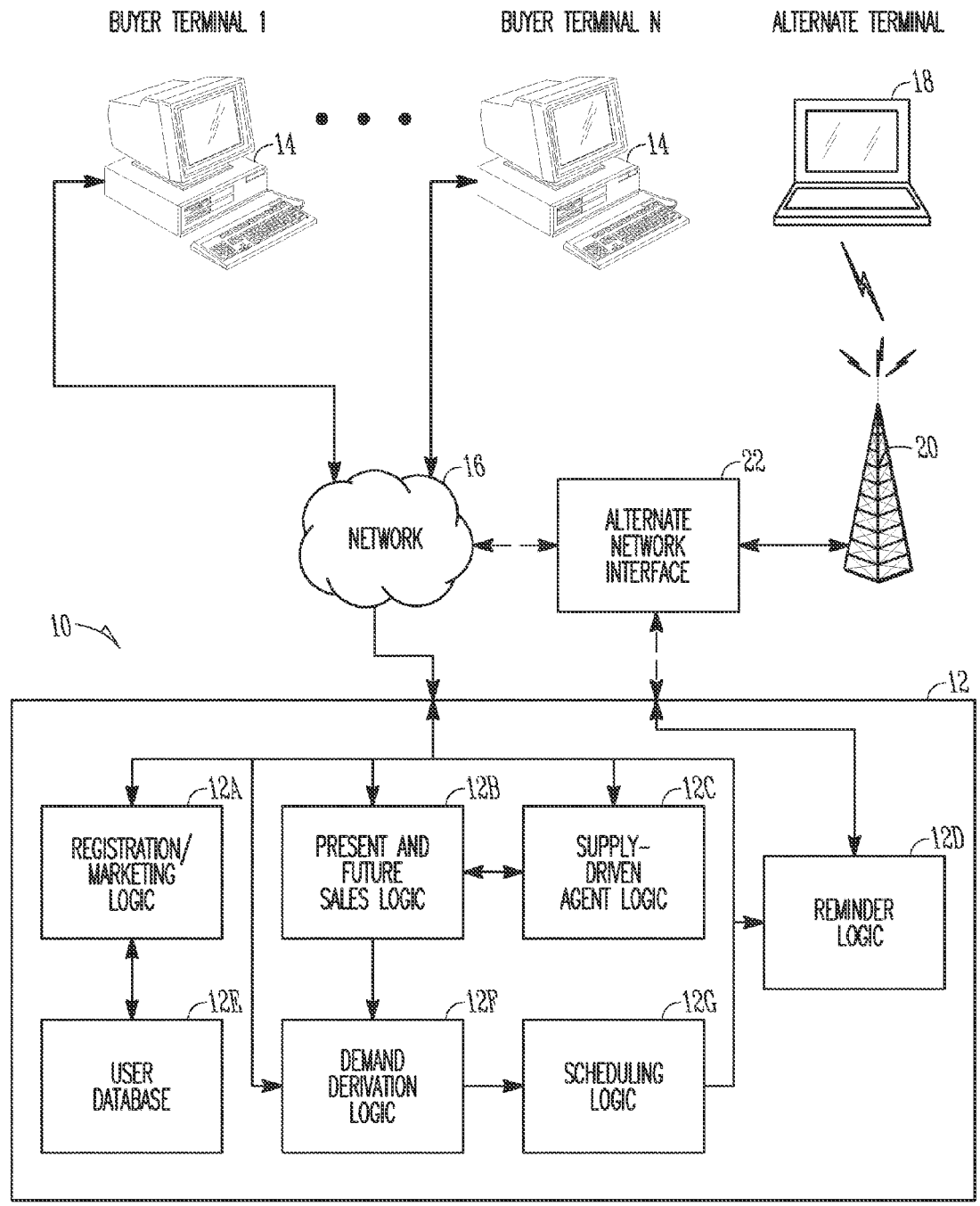
FIG. 1 is a block diagram illustrating a network sales system according to the invention, including an illustrative breakdown for its sales server.

Referring to FIG. 1, a sales system 10 according to the invention includes a sales server 12 and a number of buyer terminals 14 that are all operatively connected to a primary network, such as the internet 16. The system can also include one or more alternate terminals 18 that are connected to an alternate network 20, such as a wireless network, a telephone network, or a paging network. The sales server 12 can access the alternate network via an alternate network interface 22, either directly or through the primary network.

The sales server 12 includes registration and marketing logic 12A that is operative to communicate with a user database 12E and with the buyer terminals 14 via the network 16. The sales server 12 also includes present and future sales logic 12B that is operative to communicate with the buyer terminals 14 via the network 16 and with supply-driven agent logic 12C. The present and future sales logic 12B is further operative to communicate information to demand derivation logic 12F. The demand derivation logic 12F is operative to provide an output to the user terminals via the network and/or to scheduling logic 12G, which is also operative to provide an output to the user terminals via the network 16. Reminder logic 12D is operative to communicate with the user terminals via the network 16 and to communicate with the alternate network interface 22, if the system employs one.

In the embodiment presented, the buyer terminals 14 are personal computers running browser software that allows their users to interact with the server 12 via hypertext transfer protocol (http) over the span of one or more network connections. But numerous other platform technologies could be used to implement part or all of the system, such as dedicated hardware devices or simpler programmable devices interconnected by wireless or analog networks. Connections between elements can be intermittent (e.g., e-mail connections) or indirect. The function and structure of the server elements can also be broken down in different ways than those shown in figures, with logic elements being combined, separated, or recast as appropriate. And while the system's user interface is based on software-based graphical user interface elements, it could also be implemented in other ways, such as using physically actuated controls or auditory prompts. In addition, while the system's user interface elements are presented as displayed in windows, one of ordinary skill in the art would recognize that they could also be displayed in other types of display regions, such as screens, cards, or pages.

Sales systems according to the invention can be implemented as part of larger systems that also implement other sales mechanisms. One such system that is a suitable host for features described in this application is presented in a co-pending, commonly owned application entitled "Publishing System for Network-Based Sales," filed Nov. 16, 1999, issued Ser. No. 09/441,385, and herein incorporated by reference.

Referring to FIGS. 1 and 2, an item pricing window 30 can include a bid area 32, a price schedule area 34, a variable-price agent area 36, and a utility area 38. The bid area 32 presents information about the overall offering, including a manufacturer's suggested retail price (MSRP), an opening price, a current price, an open date, a close date, and a listing number. In the present embodiment, the bid area 32 is presented as a boxed table in the item pricing window 30.

The price schedule area 34 includes a date sequence indicator 40, which can be a columnar list of dates derived by the scheduling logic 12G. It also includes a price indicator area 42, which can be a columnar list of prices, and a markdown indicator area 44, which can be a columnar list of markdown percentage values. A demand indicator area 46 is located in the price schedule area as well, and it includes one or more demand indicators that can be associated with the dates and/or prices. In the embodiment shown, the demand indicator takes the form of a bar chart with variable-length bars for each date and price. One or more odds indicators 48 can also be provided, and in this embodiment these take the form of a textual indication for each date and price. The schedule area 34 further presents a series of buy buttons 50, including one or more present buy buttons and one or more future buy buttons.

In the embodiment shown, the schedule area 34 is organized as a table, with a date indicator, a price indicator, a demand indicator, an odds indicator, and buy buttons being located side-by-side for each row in the schedule column. But numerous other formats for this area are also possible. The area could be organized as a two-dimensional calendar, for example, with indicators within the day entries for the calendar. The table could also be presented in a collapsible outline view, allowing users to actuate controls to reveal hidden entries presented by the system and to hide visible ones. The price points can be presented explicitly as price numbers, or they could be presented in other ways, such as by displaying discount values, formulae, or textual explanations. In addition, the table might not require a one-to-one correspondence between indicators, with demand and odds indicators being provided for the current price only, for example.

The variable-price agent area 36 includes a price entry area 52 and a future buy button 54. The price entry area 52 is a numerical entry area that receives a maximum price for the item from the user, and the future buy button 54 allows the user to submit this price to the system. The utility area 38 includes two help controls that lead the user to informational windows and a page e-mail control that allows the user to send a copy of the page to another individual by e-mail.

Note that while the system presented is particularly well suited to lots of goods whose value is subject to decline, such as perishable goods, overstock, or seasonal retail items, this system can also be used to sell a variety of other types of items, such as durable goods, services, and intangibles. In addition, while the system is organized around price falling over time, other metaphors could be used as well, such as price increasing as goods are finished.

In operation, when an offering opens, the sales server 12 populates the item pricing window with a default sales schedule. The end date and time for the offering are determined from the type of items sold. This determination can be performed manually by an experienced sales system operator or be partially or fully automated based on a database of past sales experience. The timing and value of intermediate price points between the open and close date can be linear or follow another appropriate progression, and this progression can also be derived manually or automatically. The markdown values are derived directly from the price changes. At the beginning of an offering, the demand indicators and odds indicators can be left blank or left at some average, predicted, or nominal level. Note that the values shown for the various indicators in the figures are illustrative only and do not correspond to an actual sale of an item.

Once the offering is under way, users can choose to purchase items at the current price by actuating a present buy button. If the user is already registered with the sales system, this selection will preferably lead him or her to one or more confirmation windows allowing him or her to confirm his or her selection and complete the purchase transaction. If the user is not registered, he or she will first be lead to user registration windows.

The user may also actuate one of the future buy buttons to place a bid for the item at a later date, when the item is scheduled to reach one of the lower displayed price levels. This type of purchase choice constitutes an unconditional promise by the user to buy at the stated price level, and the system will fulfill the purchase as soon as the stated price is reached. Upon detecting the user's selection, the system will therefore lead him or her to one or more confirmation windows allowing him or her to confirm his or her selection and complete the purchase transaction at the time of making the commitment. If the user is not registered, he or she will first be lead to one or more user registration windows.

Users can also choose the variable-price agent to make their purchase by actuating the future buy button 54 in the variable-price agent area 36 with a maximum price in the price entry area 52 to invoke the supply-driven agent logic 12C. The maximum price does not need to be set at one of the price points displayed. The variable price agent will then await low levels of supply for the item and award the item at the price reached at that time, consistent with the maximum provided by the user in the price entry area 52. Note that when there is insufficient supply to satisfy all variable price agent bids, the maximum prices in these bids will be used to resolve conflicts, in much the same way that absentee bids are resolved in a traditional English auction. And while each of the three types of bids described above can involve some sort of confirmation window, it is also possible to allow registered users to make firm commitments for present and future purchases by a sole click on a present or future buy button.

The demand indictors provide feedback to the user about the state of the offering. These indicators can be derived by the demand derivation logic 12F from the supply available and/or different types of purchase commitments made, as tabulated by the present and future sales logic 12B. They may also take into account reminder requests, which are discussed below. The relationship between the indicator values and the purchase commitments is preferably determined empirically for different types of items and can be stored in one of a variety of suitable formats, such as a function, a table, or a set of rules. Satisfactory performance may also be obtained from other approaches, however, such as universal mathematical formulas designed to work for a range of different categories of items. Note that it is probably quite difficult or even close to impossible to simulate strictly defined demand levels with absolute accuracy, but even relatively coarse approximations may be quite useful. Ideally, the feedback provided should cause the user's experience to duplicate that of a shopper at bargain basement store where he or she is able to plainly see other shoppers quickly snatching up the last available stock of an item.

The demand indicators within the price schedule area 34 can also take on different formats. Possible formats can include textual formats (e.g., high, average, low), pictorial formats (e.g., flames to indicate high demand, ice to indicate low demand), graphical formats (e.g., bars, charts, graphs), or numeric values (e.g., percentages, scores). These formats can be hard-wired, or one of a number of them can be selected by the user.

The indicators may also provide different amounts and types of information to the buyers. They may display qualitative textual odds that are not as precise as numerical scores, for example, or they may display one of a small number of pictures, which are even less precise. For any given system, the exact choice of the types of information to be conveyed, the precision of that information, and the format of that information will depend on a number of factors, including feedback from buyers and sellers, aesthetic considerations, and the amount of information to be conveyed to the buyer. In a business-to-business environment, for example, the indicators will likely be more conservative bars or numbers, whereas in retail environments, more visually stimulating icons might be used. And in a market for highly fungible and well-understood commodities, it may be beneficial to provide buyers with more types of information at higher precision levels, while the opposite may be true in a market for one-of-a-kind luxury items.

In one embodiment, the demand indicators are displayed as a series of bars for different price points, and the bars are divided into three areas. The width of a left area of the bar is proportional to the number of items already sold. The width of a central area of the bar is proportional to the number of items already reserved at the level for which the bar is displayed. The width of a right area of the bar is proportional to the number of items for which no commitment has been made. The areas are displayed in red, orange, and green, respectively.

The odds indicators 48 express the odds of obtaining particular goods at any particular price level. These indicators can be derived from the supply available, different types of purchase commitments made, and/or from reminder requests. The information that they convey can therefore be very similar to that conveyed by the demand indicators, making their derivation a matter of a single multiplication. The odds indicators may also differ from the demand indicators in a variety of ways. For example, the odds indicators could be less precise than the demand indicators, they could be more conservative than the demand indicators, or they could even be based on formulae that take different factors into consideration.

Figure 6:
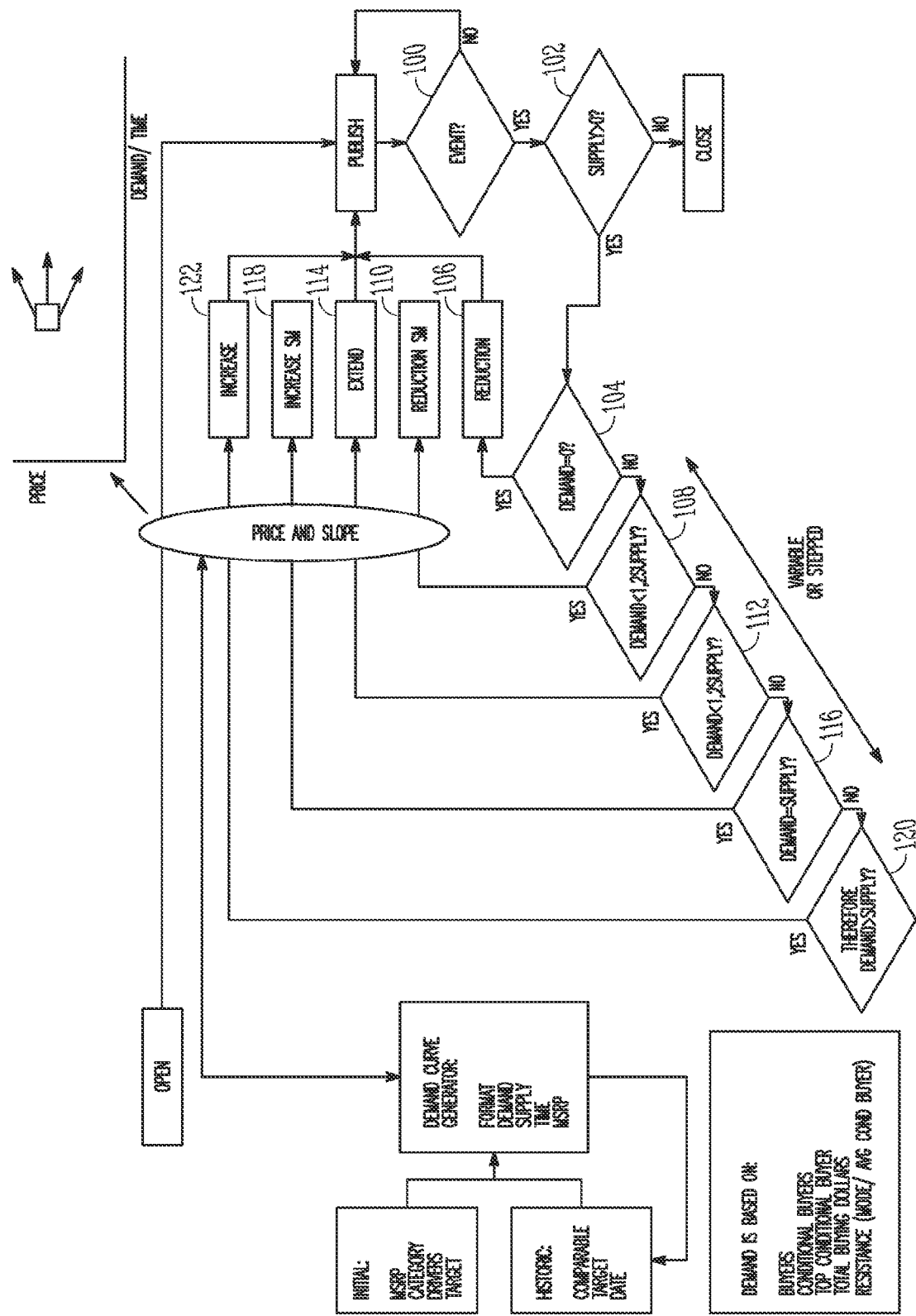
FIG. 6 is a flowchart illustrating the operation of the system of FIG. 1.

Referring to FIGS. 3 and 6, demand values can also be used to adjust the offering schedule's timing, prices points, or both. As shown in FIG. 3, for example, the sales schedule can be shortened if there appears to be little interest in an item at the current price. Reservation and reminder levels at lower prices can also be considered in making this decision.

There are numerous ways to implement demand feedback in a system, with design variables ranging from the type of goods, the available alternatives, and prior experience with similar goods, to economic theory, statistical analysis, and inferences drawn from market research. This process of developing demand-derivative functionality will also be likely to be a dynamic one, with seasonal, generational, and even weather-dependant influences. And a model that works well with particular goods one year might not work well for similar goods the next year for reasons that might only be apparent after the offering. So-called resistance points, which may be influenced by buyer cost considerations or available alternatives may also introduce significant non-linearities into the models. It is therefore expected that the derivation of exact demand feedback models for families of products will be an ongoing and relatively complex process.

In one embodiment, each time a tracked event (step 100), such as a purchase or purchase commitment, is detected, and the supply is not fully depleted (step 102), the demand can be adjusted. Such adjustment can include extending or shortening time increments, or raising or lowering price points. In one embodiment, if little or no demand is detected for the item at the current price level (step 104), the price can be reduced for current and/or later price points (step 106). Detecting somewhat higher levels (step 108) can lead to somewhat higher price reductions (step 110). When a particular mid-level demand threshold is exceeded (step 112), the duration of the current and/or later price periods can be extended (step 114). Detecting moderately high levels of demand (step 116) can lead to moderate price increases (step 118) for current and/or later price points, and detecting higher levels of demand (step 120) can lead to higher price increases (step 122) for this and/or later price periods. The levels at which price or timing is adjusted can be continuous or stepped. Preferably, the system makes the adjustments on a near-real-time basis, with a response time of well under an hour and preferably under a minute.

As illustrated in FIG. 3 price reservations can cause lower price points to be eliminated. If buyers sign up for all of the items that are available at a later price, such as $5.00, no further orders can be placed at this price. Additional buyers can now make higher offers, such as $10.00, but no longer have access to controls for the sold-out price points.

Figure 5:
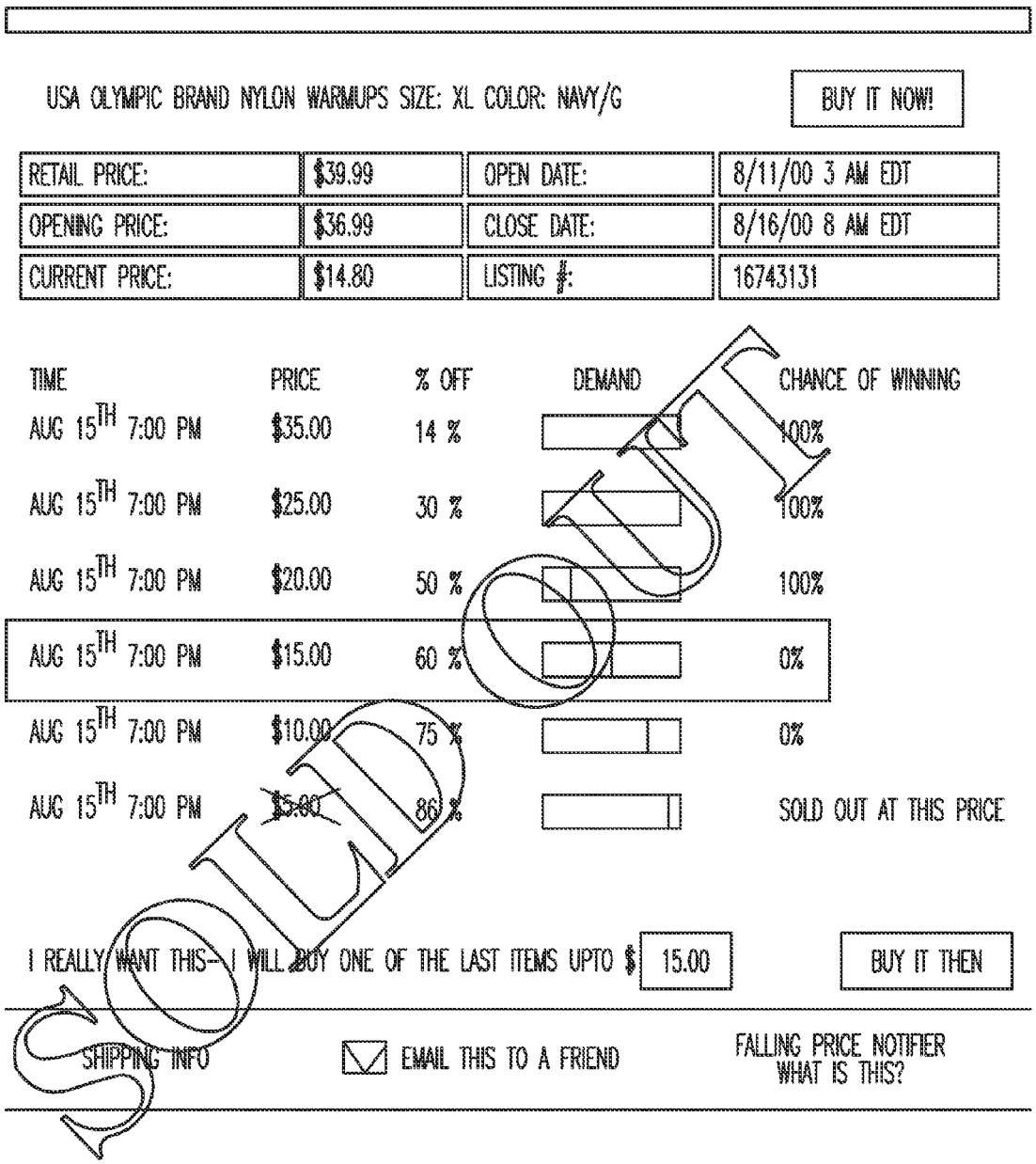
FIG. 5 is a buyer's terminal screen view of the item pricing window of FIG. 2 in quantitative feedback mode at a fourth point in time on the second day of the sale after exhaustion of the item.

Referring to FIGS. 4 and 5, as the offering progresses, the system displays fewer purchase controls, and the demand indicators and odds indicators change to reflect ongoing purchasing activity. Finally, when the last item is sold, the item window displays an indicator that the offering has ended, with the indicators also displaying final numbers. These final numbers can allow users who bought or failed to buy an item an idea of the strength of their bidding strategy.

Referring to FIG. 7, the item pricing window can also include a tickler feature that can be implemented by the reminder logic 12D. This feature provides for the display of reminder request buttons 120 for future price points. The user can select one of these buttons if he or she is interested in an item at a future price point, but is not willing to make a firm commitment to buy it at the corresponding time. Once the price reaches the point specified by the reminder request, the system sends a reminder message to the user.

Preferably, the reminder message is sent in such a way that the user is alerted to the reminder by an alert mechanism. This can involve sending the reminder via an alternative network, such as via a telephone or pager network. It is also preferable for the alert message to include a response feature allowing the user to respond to the message with a commitment to buy the item. With a telephone reminder message, this response feature could request that the user press a digit key on their telephone set to signal their acceptance of the reminder offer, using DTMF signaling, for example. Two-way pagers, personal data assistants, and other wireless terminals can allow the user to actuate a button on a control window for the offer, using WML cards, for example.

This reminder mechanism allows a user to visit a sales site once, make a decision about a particular item, and then continue to shop. If the item becomes available at the desired price, the user can respond to the notification with a purchase request. But if he or she finds a better price on a comparable item before receiving the reminder, the user can simply ignore or decline the notification offer.

It is generally advantageous to provide that the tickler feature be as easy to operate as possible. In one embodiment, for example, a registered user only needs to press one of the tickler buttons to complete the reminder request. There are no confirmation windows of any kind for registered users. This makes it very easy for the user to sign up to follow a number of different offerings.

If a visiting unregistered user actuates a tickler button, the registration logic 12A will present him or her with a registration window that requests contact information to be stored in a user database 12E. The tickler feature therefore encourages potential users to sign up, particularly if there is no fee for registering or requesting a reminder. The system can then send them other marketing materials to encourage them to return.

Note that selecting a reminder for a particular price can be treated as an event that affects demand computations. Such an input might also be weighted by the user's tendency to accept reminder offers. A request by a user who has requested numerous reminder offers in the past, but has never accepted one, would affect demand less than a request by a user who has a track record of consistently accepting his or her reminder offers.

Figure 8:
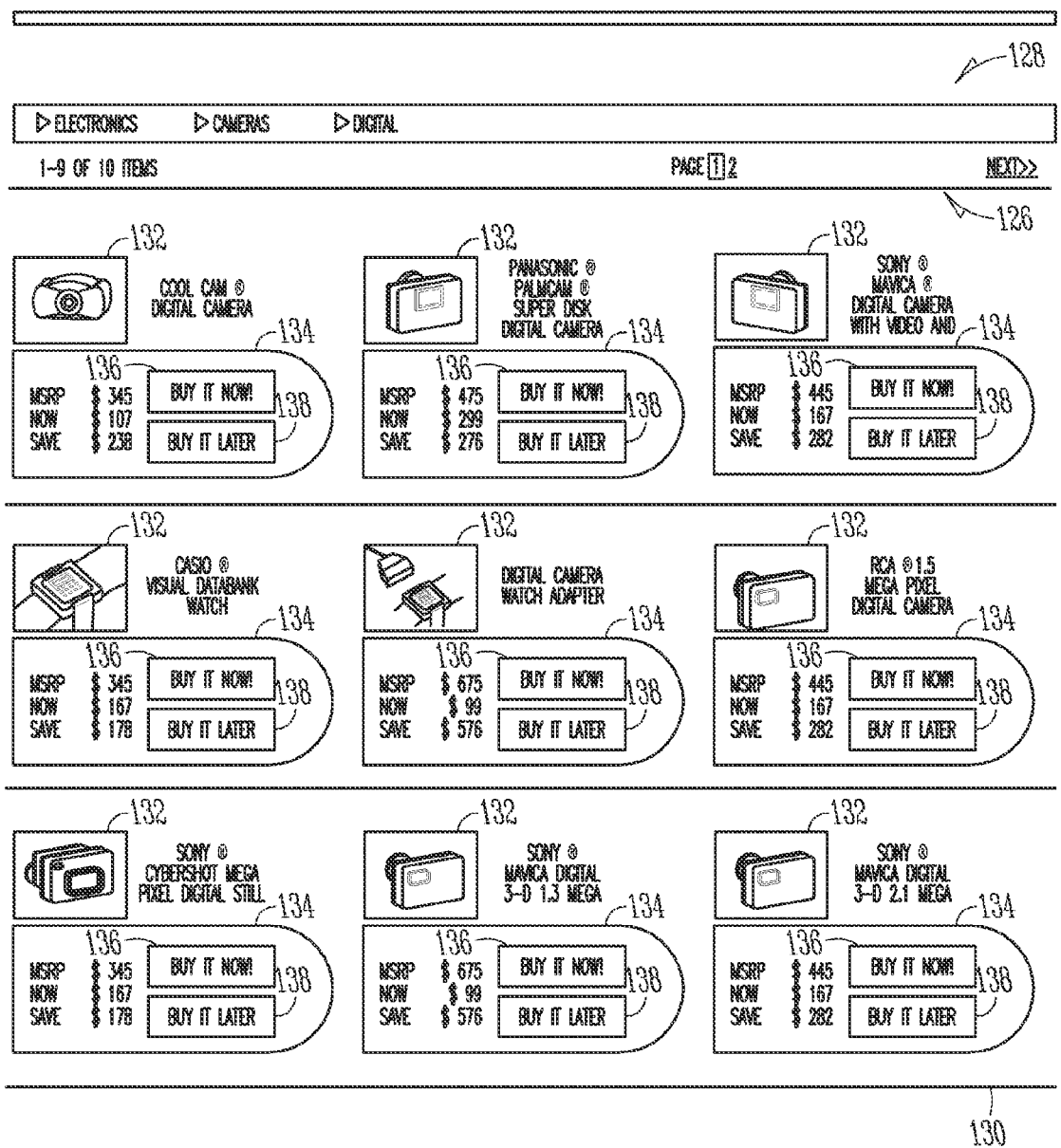
FIG. 8 is a buyer's terminal screen view of an illustrative catalog window in qualitative feedback mode for an item for sale on the network sales system of FIG. 1 at a first point in time on the second day of a sale.

Referring to FIG. 8, the system (e.g., system 10 in FIG. 1) can allow for item browsing via a catalog window 130. This window includes a number of item images 132 associated with price boxes 134. Preferably, the outline of these boxes is shaped to imitate some readily recognizable sort of price tag or price label, to clearly convey their function to users. In one embodiment, the price tag is generally rectangular with two corners curved, and a hole to simulate a tag affixed to a garment with a string. Other visual features can also convey the impression of price tag or label, however, such as borders, shadowing or simulated perforations. Each price box can include the item's MSRP, its current price, and its current discount. Also included in each box are a present buy button 136 and a future buy button 138. Pressing the present buy button has the same results as pressing the present buy button in the item pricing window.

Figure 9:
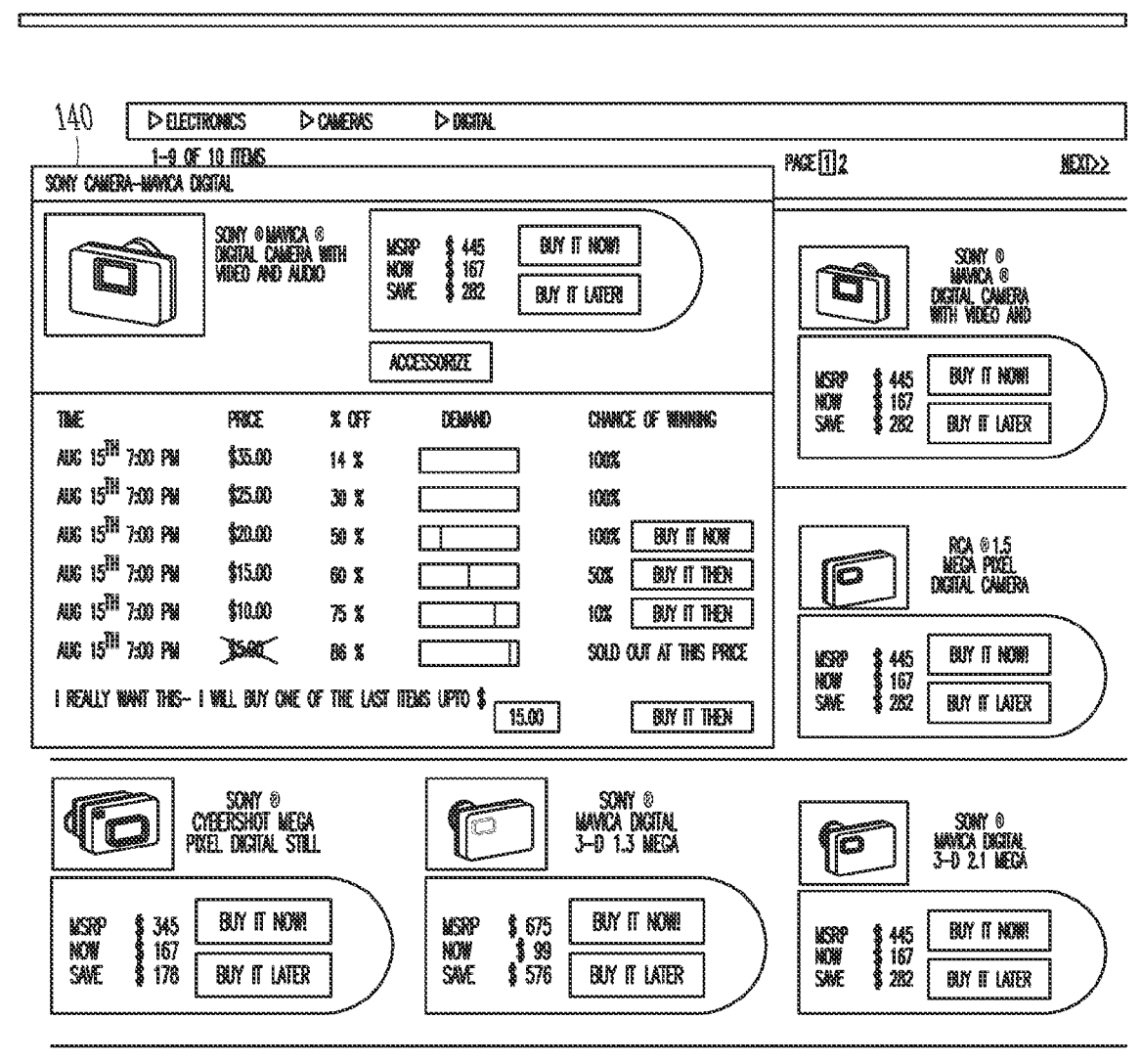

Referring also to FIG. 9, pressing a future buy button 138 for an item can bring the user to the item pricing window 30, or it can cause a smaller item pricing window 140 to be overlaid on top of the catalog window 130. In one embodiment, the overlaid window is also displayed in response to the user simply placing his or her mouse over the image of the item or one of the controls for the item. This ready availability of the pricing information can allow a user to quickly decide whether he or she should make a current or future offer on the item, but does not clutter the window with too much information, which could interfere with browsing. The catalog window 130 can also include a number of navigation commands 126 in a navigation window 128, allowing the user to access other catalog pages.

Figure 10:
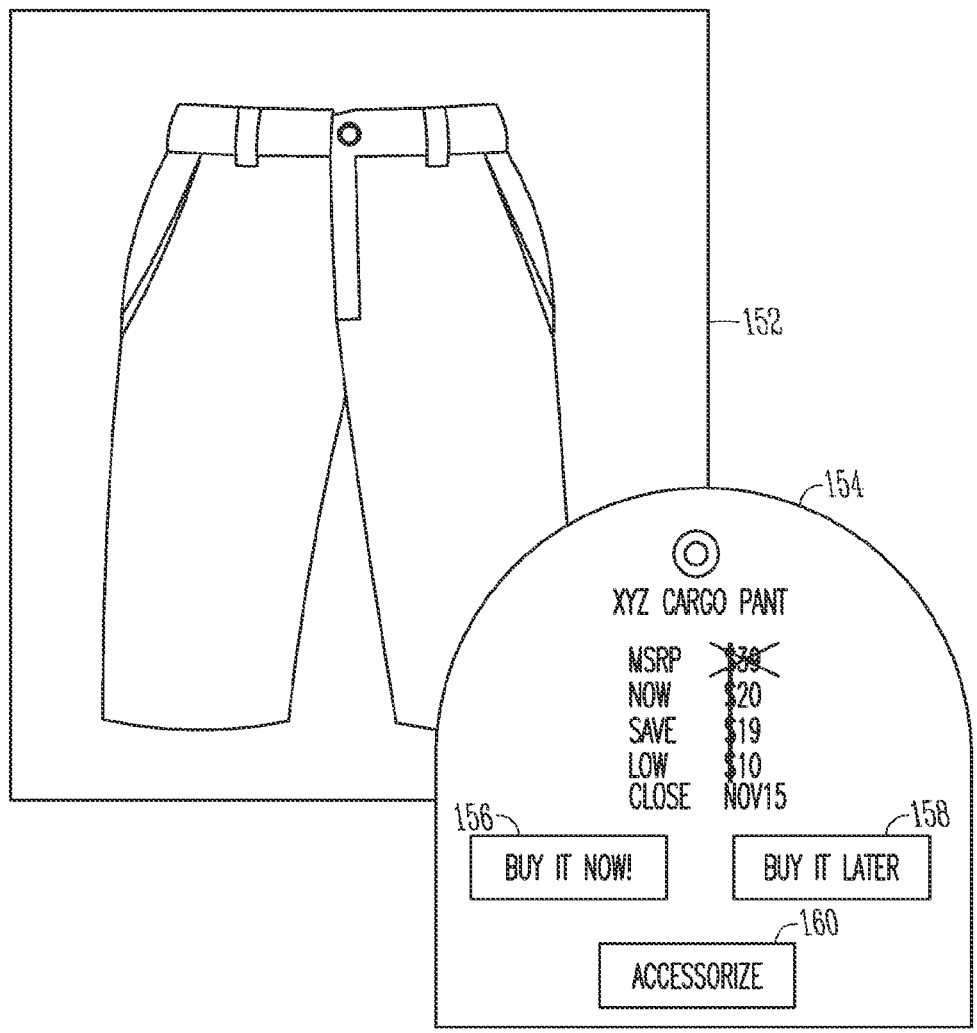
FIG. 10 is a buyer's terminal screen view of an illustrative gallery window for an item for sale on the network sales system of FIG. 1.

Referring to FIG. 10, clicking on an image for an item can bring the user to a gallery window 150. This window shows a larger version of the image 152 and a larger price box 154. The larger price box 154 can include more pricing information than is shown in price boxes displayed in the catalog window 130, but less than is shown in the item pricing window. In one embodiment, the price box 154 includes the item's MSRP, its current price, its current discount, its closing price, and its closing date. Also included in the price box 154 are a present buy button 156 and a future buy button 158, as well as an accessorize button 160. The accessorize button 160 leads the user to a catalog page that presents items that complement the displayed item. By linking this type of information, users are likely to see more items that they are likely to want to purchase. And knowing that particular accessories are available for an item may make a user more likely to buy that item.

Information can also be compiled based on buyer's use of the system. This information is particularly rich, because it is based not only on sales actually made, but on failed bids and reservations as well. Using this information, a buyer can be informed that he or she is consistently close to winning bids for one type of goods, for example, and that small increases in his or her bids would result in many more awards of items. Or users can be informed of upcoming offerings of goods that are similar to those they bid on but lost.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A networked sales method, comprising:
   presenting with a sales server, via a first network, item information associated with an item on a sales screen to a user, the item information including an item identifier for an item, and a price box for the item;
   communicating with a sales server a variable price schedule for the item to the user, the variable price schedule including a plurality of entries, each entry indicating a price at which the item is to be offered for sale in a specified time period;
   receiving at the sales server a reminder request associated with an entry in the variable price schedule; and
   notifying the user through a second network with a near-real-time alerting mechanism when the price of the item is the price indicated in the entry associated with the received reminder request, the second network being a wireless network.

2. The method of claim 1 wherein the notifying the user includes presenting a purchase acceptance control button to the user.

3. The method of claim 2 wherein presenting the purchase acceptance control button to the user includes requesting that the user signal acceptance of a purchase using dial keys of a telephone connected to a telephone network over which the user receives notification of the price of the item being the price indicated in the entry associated with the reminder request.

4. The method of claim 1 wherein acceptance of receiving a reminder request from the user is contingent upon receipt of contact information for the user, wherein the presenting of the item is independent of the receipt of any contact information from the user.

5. The method of claim 1 wherein the reminder request is received at the sales server in response to only a single click on a reminder control.

6. The method of claim 1 wherein the presentation of the item identifier includes displaying an image of the item on the sales screen and wherein the presentation of the price box displays the price box proximate the image of the item.

7. The method of claim 1 wherein the presentation of the item identifier includes displaying an image on the sales screen and wherein the presentation of the price box displays the price box to overlap the image of the item.

8. The method of claim 1 wherein the presentation of the plurality of price choices displays the plurality of choices as a series of user price selection controls.

9. The method of claim 1 wherein the variable price schedule includes at least one user price selection control button that, with a single actuation, causes a bid to be placed on the item.

10. The method of claim 1 wherein the price box has one curved edge.

11. The method of claim 1 wherein the price box has a circular marking near one of its edges.

12. The method of claim 1 further including displaying price boxes for different items and further displaying price choices for those items on the same screen.

13. The method of claim 12 further including displaying an image for each of the items on the sales screen.

14. The method of claim 1 further including displaying further price information for the item in response to user interaction with the price box.

15. The method of claim 14 wherein the displaying further price information displays the information in a window that overlays an area of the screen in which the price box and the item identifier are displayed.

16. The method of claim 14 wherein the displaying is responsive to the user locating a pointing device cursor above a screen area associated with the item.

17. The method of claim 1 wherein the price box further includes an accessorize button that is responsive to user input to retrieve information about items available that complement the item for which the price box is displayed.

18. The method of claim 1 wherein the variable price schedule includes a present price for the item and a present purchase control button next to the present price.

19. The method of claim 1 wherein the variable price schedule includes a future price for the item and a future purchase control button next to the future price.

20. The method of claim 1 wherein the communicating of the variable price schedule includes displaying the plurality of choices as a series of displayed price values each located proximate one of a plurality of purchase control buttons, and wherein the plurality of purchase control buttons includes at least one present purchase control button and at least one future purchase control button.

21. The method of claim 1 wherein the communicating of the variable price schedule includes displaying the plurality of choices as a series of displayed price values each located proximate one of a plurality of purchase control buttons.

* * * * *